US006480897B1

(12) United States Patent
Desnoyers et al.

(10) Patent No.: US 6,480,897 B1
(45) Date of Patent: *Nov. 12, 2002

(54) OPTIMISTIC TRANSMISSION FLOW CONTROL INCLUDING RECEIVER DATA DISCARDS UPON INADEQUATE BUFFERING CONDITION

(75) Inventors: Christine M. Desnoyers, Pine Bush, NY (US); Douglas J. Joseph, New Fairfield, CT (US); Francis A. Kampf, Fairfax, VT (US); Alan F. Benner, Poughkeepsie, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,965

(22) Filed: Dec. 29, 1997

Related U.S. Application Data

(63) Continuation-in-part of application No. 08/856,619, filed on May 13, 1997, now Pat. No. 5,931,915.

(51) Int. Cl.[7] ............................................. G06F 15/16
(52) U.S. Cl. ..................................... 709/237; 710/100
(58) Field of Search ............................. 370/79, 85.13, 370/230, 94.1, 276, 216, 229.95, 237, 395, 229; 395/180, 182.16, 706; 709/233, 237, 200, 236, 245, 231, 232, 216, 105, 222, 235; 371/32; 380/45, 42; 710/100; 340/825.44; 375/219

(56) References Cited

U.S. PATENT DOCUMENTS 3,906,445 A  *  9/1975  Beckmann et al. ...... 340/146.1
4,630,259 A  * 12/1986  Larson et al. ................ 370/216
4,672,543 A  *  6/1987  Matsui et al. ................ 709/235
4,745,599 A     5/1988  Raychaudhuri ............. 370/348
4,799,215 A     1/1989  Suzuki ........................ 370/227

(List continued on next page.)

OTHER PUBLICATIONS

Danzig, Flow Control for Limited Buffer Multicast, IEEE 1994.*

Primary Examiner—Mark H. Rinehart
Assistant Examiner—Thong Vu
(74) Attorney, Agent, or Firm—Floyd A. Gonzalez, Esq.; Lawrence D. Cutter, Esq.; Heslin Rothenberg Farley & Mesiti P.C.

(57) ABSTRACT

A program product for a message processing system in which messages are transmitted from source nodes to destination nodes. A transmission flow control technique is disclosed in which the source node optimistically sends control information and a data portion of a message, and wherein a destination node discards the data portion of the message if it is unable to accommodate it. The destination node, however, retains enough of the control information to identify the message to the source node, and when the destination node is subsequently able to accommodate the data portion, the destination node issues a request to the source node to retransmit the data portion of the message. Discarding of one message is followed by discards of sequential messages, until the destination node is able to accommodate the data portions of messages. The flow control technique disclosed herein is used, for example, in an environment where buffers are posted to accommodate messages at the destination node, and is particularly suited for conditions arising in multi-tasking systems where the destination node is generally assumed to be prepared to accommodate data, however, if not prepared, is likely not prepared for long periods of time.

19 Claims, 2 Drawing Sheets

U.S. PATENT DOCUMENTS

| | | | | |
|---|---|---|---|---|
| 4,908,828 A | | 3/1990 | Tikalsky | 371/69.1 |
| 4,910,733 A | | 3/1990 | Sommani et al. | 370/85.1 |
| 4,975,952 A | | 12/1990 | Mabey et al. | 380/49 |
| 5,010,546 A | | 4/1991 | Kato | 370/469 |
| 5,077,830 A | * | 12/1991 | Mallia | 455/58 |
| 5,084,871 A | * | 1/1992 | Carn et al. | 370/462 |
| 5,130,986 A | * | 7/1992 | Doshi et al. | 370/94.1 |
| 5,138,611 A | * | 8/1992 | Carn et al. | 370/60 |
| 5,247,694 A | | 9/1993 | Dahl | 395/800 |
| 5,253,342 A | | 10/1993 | Blount et al. | 395/200 |
| 5,257,374 A | * | 10/1993 | Hammer et al. | 709/105 |
| 5,289,470 A | | 2/1994 | Chang et al. | 711/173 |
| 5,339,313 A | * | 8/1994 | Ben-Michael et al. | 370/85.13 |
| 5,371,731 A | | 12/1994 | Pratt et al. | 370/216 |
| 5,371,897 A | * | 12/1994 | Brown et al. | 709/222 |
| 5,404,353 A | * | 4/1995 | Ben-Michael et al. | 370/79 |
| 5,422,893 A | | 6/1995 | Gregg et al. | 371/32 |
| 5,432,798 A | | 7/1995 | Blair | 714/748 |
| 5,448,561 A | | 9/1995 | Kaiser et al. | 370/471 |
| 5,450,546 A | | 9/1995 | Krakirian | 710/57 |
| 5,463,382 A | | 10/1995 | Nikas et al. | 340/825.44 |
| 5,487,072 A | * | 1/1996 | Kant | 371/32 |
| 5,570,367 A | * | 10/1996 | Ayanoglu et al. | 370/94.1 |
| 5,612,950 A | * | 3/1997 | Young | 370/276 |
| 5,625,823 A | * | 4/1997 | Debenedictis et al. | 395/706 |
| 5,627,970 A | * | 5/1997 | Keshav | 709/233 |
| 5,630,059 A | * | 5/1997 | Brady et al. | 709/200 |
| 5,659,702 A | * | 8/1997 | Hashimoto | 709/245 |
| 5,663,948 A | | 9/1997 | Kobunaya | 370/229 |
| 5,664,091 A | * | 9/1997 | Keen | 395/182.16 |
| 5,694,473 A | * | 12/1997 | Bright et al. | 380/42 |
| 5,699,500 A | * | 12/1997 | Dasgupta | 395/180 |
| 5,701,427 A | * | 12/1997 | Lathrop | 709/200 |
| 5,721,830 A | | 2/1998 | Yeh et al. | 709/237 |
| 5,727,002 A | * | 3/1998 | Miller et al. | 371/32 |
| 5,732,082 A | | 3/1998 | Wartski et al. | 370/395 |
| 5,764,919 A | * | 6/1998 | Hashimoto | 709/236 |
| 5,801,639 A | * | 9/1998 | Dorenbosch et al. | 340/825.44 |
| 5,809,148 A | * | 9/1998 | Doberstein et al. | 380/45 |
| 5,859,837 A | * | 1/1999 | Crayford | 370/230 |
| 5,878,056 A | * | 3/1999 | Black et al. | 371/32 |
| 5,881,247 A | * | 3/1999 | Dombrosky et al. | 710/100 |
| 5,903,724 A | * | 5/1999 | Takamoto et al. | 709/200 |
| 5,931,915 A | | 8/1999 | Benner et al. | 709/232 |
| 5,936,939 A | * | 8/1999 | Des Jardins et al. | 370/229 |
| 5,936,958 A | * | 8/1999 | Soumyia et al. | 370/395 |
| 5,969,674 A | * | 10/1999 | Von Der Embse et al. | 342/357.16 |
| 6,035,335 A | * | 3/2000 | Franke et al. | 709/32 |
| 6,085,252 A | * | 7/2000 | Zhu et al. | 709/231 |

* cited by examiner

OPTIMISTIC TRANSMISSION FLOW CONTROL INCLUDING RECEIVER DATA DISCARDS UPON INADEQUATE BUFFERING CONDITION

"This patent application is a continuation-in-part of U.S. patent application Ser. No. 08/856,619, filed May 13, 1997, now U.S. Pat. No. 5,931,915, issued Aug. 3, 1999 and entitled: "METHOD FOR PROCESSING EARLY ARRIVAL MESSAGES WITHIN A MULTINODE ASYNCHRONOUS DATA COMMUNICATIONS SYSTEM".

TECHNICAL FIELD

This Application relates to message processing systems. More particularly, this Application relates to a method for facilitating the transmission of messages from a source node to a destination node in a message processing system.

BACKGROUND OF THE INVENTION

Message processing systems, for example, the multiprocessor data processing system 10 depicted in FIG. 1, require reliable message communication paths between respective ones of the processors $12_1 \ldots 12_j$. The exemplary system 10 of FIG. 1 employs an exemplary communication medium or switch network 20 commonly coupled to the processors 12. The processors may require respective communication adapters $14_1 \ldots 14_j$ to control communications between each processor 12 and the medium 20 via respective connections $16_1 \ldots 16_j$. Communication between, for example, software application(s) executing on the processors 12 of system 10 can thus be provided via medium 20. Storage medium 22 may be employed in the system to hold the applications, associated data, etc.

Because respective processors may be supporting different, but related application software partitions, messaging must be used as a form of communication between the processors. For example, messages may require transmission from a "source" node (e.g., processor $12_1$) to a "destination" node (e.g., processor $12_j$).

The asynchronous nature of the application software partitions on the source and destination nodes often results in a condition where the number of messages sent from a source node exceed the destination node's ability to handle them. Normally, the destination node is expected to post buffers to hold incoming messages. The messages can then be retrieved from the buffers and appropriately processed by the application software. This is illustrated in FIG. 2, which is a hybrid hardware/software diagram of a message processing system like that of FIG. 1 and which depicts a message source node $18_1$ and a message destination node $18_j$. (The term "node" is used broadly herein to connote any identifiable combination of hardware and/or software to or from which messages are passed.) Source node $18_1$ has allocated therein send message buffers 30 within which are placed messages M(1), M(2) and M(3) which, for application reasons, are required to be sent through send message processing 32, across medium 20, to destination node $18_j$.

Destination node $18_j$, in anticipation of the arrival of messages from various sources in the system, can allocate or post receive buffers 40. In the example of FIG. 2, buffer B1 holds the first arriving message M(1), buffer B2 holds the second arriving message M(2) and buffer B3 holds the third arriving message M(3). Received message processing 42 then removes messages from their buffers and can then pass the messages to receive processing 44 (e.g., the application software partition executing at the destination node).

Those skilled in the art will understand that message ordering in a system can be imposed by using a particular protocol, e.g., messages sent from a particular source to a particular destination may be sequentially identified and the sequential indicia can be transmitted as control information along with the data portions of the messages.

The process of allocating or posting receive buffers 40 in destination node $18_j$ is often a dynamic one, and if more messages are arriving than there are buffers posted, buffer overrun can occur. Traditional solutions to avoid buffer overrun at the destination node include 1) data buffering with a pre-reservation protocol or, 2) adopting a convention wherein the destination node automatically discards packets assuming that the source node will retransmit them after a time-out. The first solution assumes a destination node that is frequently unprepared to accommodate data, and the second solution assumes a destination that is rarely unprepared to accommodate data.

A problem with the first solution occurs when message size is practically unbounded, or if the number of message sources is large. Large messages can be decomposed into smaller pieces and flow controlled into the buffers, if the overhead to do so is manageable. However, many sources present problems with buffer fragmentation or starvation. Distributed fairness protocols can be introduced to solve these problems, but at a price in complexity and additional overhead.

A problem with the time-out/retransmit solution is that should the destination be unable to accommodate the data for an extended period of time, many needless retransmits will occur, occupying otherwise useful bandwidth on the medium.

A third conventional solution to this problem is a rendezvous protocol. A rendezvous protocol involves the transmission from the source node of a control information packet relating to a message to be sent from the source node to the destination node. The control information may include an indication of the length of the entire data portion of the message to be sent, as well as indicia which identifies the message and/or its sequence. When a buffer of adequate length is allocated or posted at the destination node, an acknowledgment packet transmission is sent from the destination node to the source node, and the source node can thereafter reliably send the entire message to the destination node. This technique also makes conservative assumptions about the preparedness of the destination node to accommodate the data portion of the message. In conventional rendezvous protocols, the initial exchange of the control information and acknowledgment packets results in a loss of performance because two packets are now required to be exchanged between the source and destination nodes before any actual message data can be exchanged.

What is required, therefore, is a method, system, and associated program code and data structures, which prevent the performance degradation associated with packet retransmission after time-outs, or with standard rendezvous protocols in which an exchange of packets between source and destination nodes occurs before any actual message data is exchanged.

SUMMARY OF THE INVENTION

The shortcomings of the prior approaches are overcome by the present invention, which relates to a program product for facilitating the efficient transmission and flow control of messages from a source node to a destination node in a message processing system.

The present invention seeks to strike a balance between the ultra-conservatism of pure buffering and rendezvous, and the ultra-optimism of time-out/retransmit. The present invention assumes that the destination is generally able to accommodate data portions of messages, but if it is not, the time that it may take to become prepared may be very long. Such conditions often arise in multi-tasking systems where context swaps between processes are long and a process may be suspended for an unbounded period of time. To accommodate this type of environment, the present invention involves optimistically sending the data portion of a message along with control information, in an initial transmission from the source to the destination. However, it is not appropriate for the destination to discard the entire content of this transmission if it is unable to accommodate the data since there may be many time-out periods before the destination is subsequently able to accommodate the data. Therefore, the destination retains enough control information to identify the message to the source, but discards the data portion of the message (i.e., "runts" the message). The source does not time-out/retransmit, rather, it waits for the destination to notify it that it is prepared. At that time, the source retransmits the message, knowing the destination will be able to accommodate it. The number of retransmissions from the source node to the destination node is therefore bounded to one.

In that regard, in one aspect, the present invention relates to a flow control method for transmitting a plurality of messages from a source node to a destination node in a message processing system. The plurality of messages includes a first message comprising a data portion. The source node transmits the data portion of the first message, and control information of the first message, to the destination node. In response to the destination node being unable to accommodate the data portion of the first message, the destination node discards the data portion of the first message.

In further response to the destination node being unable to accommodate the data portion of the first message, the destination node retains at least some of the control information of the first message.

In response to the destination node being subsequently able to accommodate the data, the destination node uses at least some of the retained control information to transmit a first "pull" request to the source node to retransmit the data portion of the first message. In response to this pull request, the source node retransmits the data portion of the first message to the destination node.

The discarding process is repeated for messages subsequent to the first message, until the destination node becomes able to accommodate the data portion of the first message, as well as the data portions of the subsequent messages. In that regard, the present invention relates to, in another aspect, the destination node discarding the data portion of the first message (in response to being unable to accommodate the data portion) but retaining sequence indicia of the control information thereof, and sends a negative acknowledgment relating to the first message to the source node (i.e., "runts" the first message). Until it is able to accommodate any data portions of messages, the destination node discards respective data portions of subsequent messages that are received thereby, but retains the respective sequence indicia of the respective control information thereof, and sends respective negative acknowledgments relating thereto the source node.

As the destination node becomes able to accommodate the respective data portions of the first message and any of the subsequent messages, the destination node initiates, via respective pull requests to the source node, respective retransmissions of the respective data portions of the first message and said any of the subsequent messages. In response to respective pull requests from the destination node, the source node retransmits the respective data portions of the first message and said any of the subsequent messages to the destination node.

To control this operation at both the source and destination nodes, the source node maintains a message sent number, as well as an expected acknowledgment number, which is incremented as respective acknowledgments of successfully accommodated data portions of messages are received from the destination node. The destination node maintains a respective message number which is incremented as respective initial transmissions or retransmissions of data portions are successfully accommodated, as well as an expected "runt" number which is incremented as respective data portions of messages are discarded and negative acknowledgments transmitted to the source node therefor.

The herein disclosed flow control variant of the rendezvous protocol strikes a balance between the ultra-conservatism of pure buffering and rendezvous, and the ultra-optimism of time-out/retransmit, since it assumes that the destination is generally prepared, but if it is not, the time it may take to become prepared can be very long. This optimistic assumption leads to medium bandwidth savings, and further, the number of retransmits from the source node to the destination node is bounded to one.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE PREFERRED EMBODIMENT(S)

Figure 1:
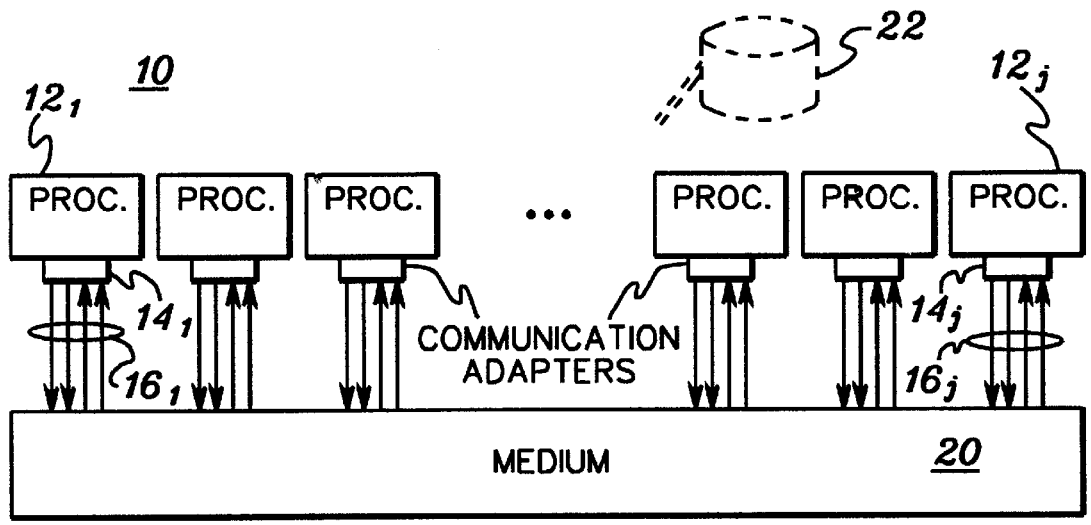
FIG. 1 is an exemplary message processing system in the form of a multiprocessor data processing system having a plurality of processors coupled by a communication medium.

As discussed above, FIG. 1 depicts an exemplary message processing system in the form of a multiprocessor data processing system 10 having a plurality of processors $12_1 \ldots 12_j$. Each processor may have a respective communication adapter 14 for operating its respective connection 16 to a commonly connected medium or switch network 20. A storage medium 22 may also be provided in the system to hold and/or support application software and all relevant data structures, protocols, etc.

Figure 2:
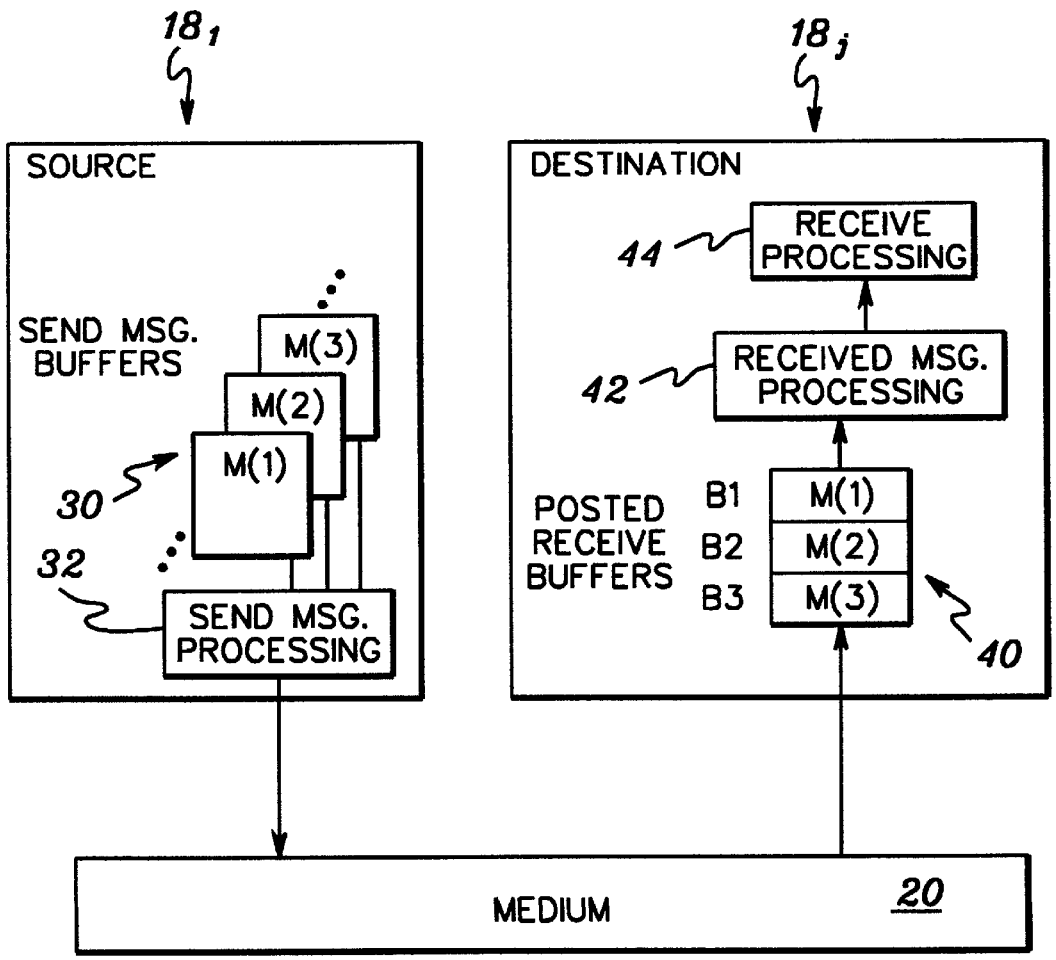
FIG. 2 is a hybrid hardware/software diagram of a message processing system having message source and destination nodes, and posted receive buffering for message reception at the destination node.

FIG. 2 is a hybrid hardware/software diagram of a generalized message processing system having a message source node $18_1$ and a message destination node $18_j$. The term "node" is used broadly herein to connote any identifiable combination of hardware and/or software to or from which messages are passed.

It is assumed hereafter for illustrative simplicity that the application running on the message processing system requires messages 30 to be sent from the source node $18_1$ to the destination node $18_j$ via the medium 20. (However, all nodes in an actual system are expected, though not required, to contain both the message sending and receiving capabilities discussed herein, since each node would generally be expected to send and receive messages in accordance with the message transmission modes disclosed herein.)

Figure 3:
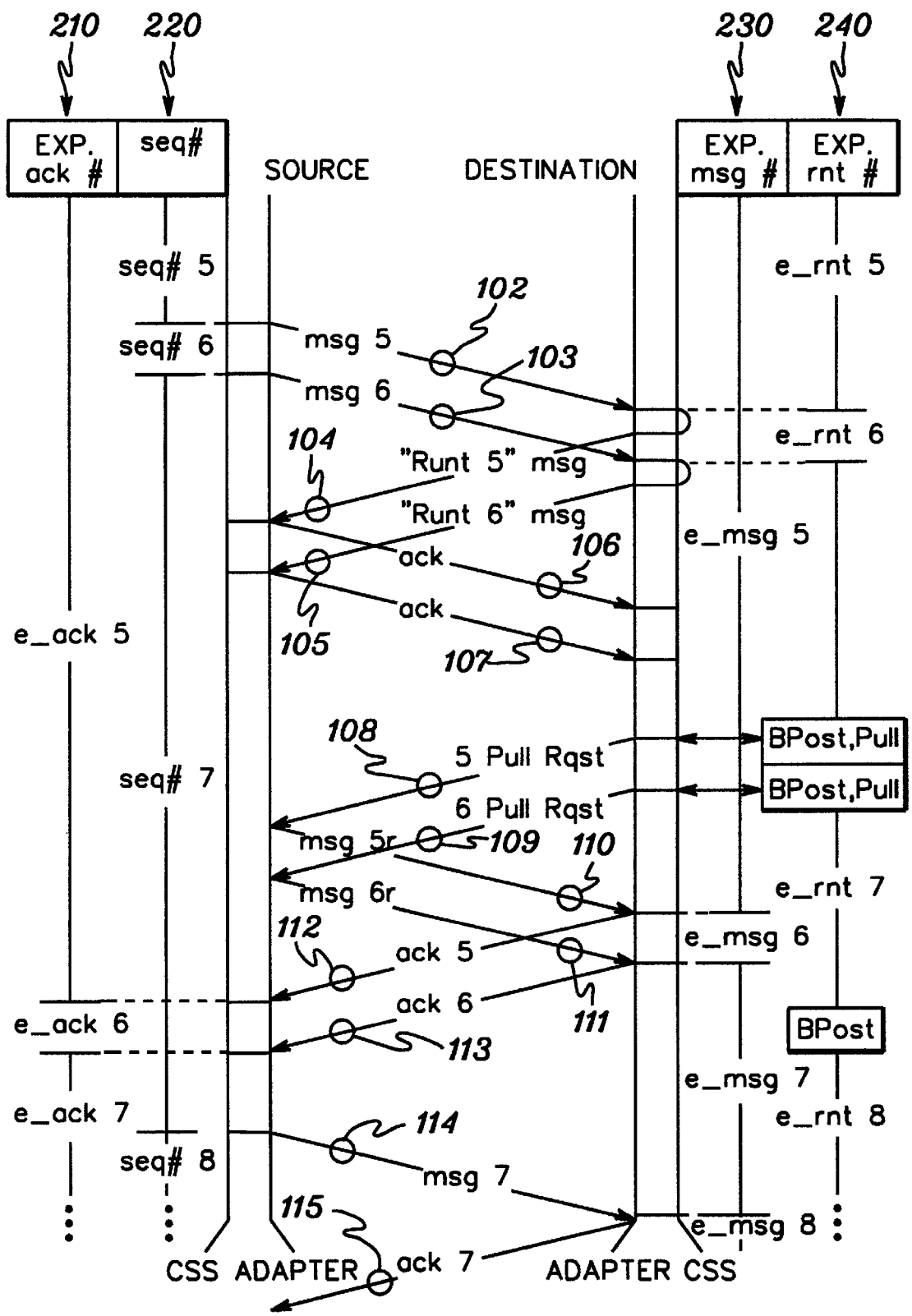
FIG. 3 is a protocol diagram of the flow control technique of the present invention in which data portions of messages are discarded by the destination node and are later retransmitted from the source node in response to pull requests from the destination node.

In accordance with the present invention, as illustrated in the protocol diagram of FIG. 3, a flow control method for transmitting a plurality of messages (msg__5, msg__6 and msg__7) from a source node to a destination node is depicted. To support this protocol, the source node maintains an expected acknowledgment number 210 and a sequence number 220. Further, the destination node maintains an expected message number 230, and an expected runt number 240. As discussed further below, these values are incremented at certain points during the operation of the protocol.

This exemplary protocol diagram assumes that msg__5 is the next sequential message to be transmitted from the source node to the destination node. Therefore, a transmission of msg__5 102 occurs from the source node to the destination node. The destination node, in expectation of this msg__5, has its expected message number, as well as its expected runt number, set at the value 5. However, in accordance with the general condition described above, i.e., the inability of the destination node to accommodate the data portion of msg__5, (due, for example, to buffer unavailability) the message is "runted" and the data portion thereof discarded at the destination node. In response to this condition, the destination node may send a runt__5 message 104 to the source node, which is effectively a negative acknowledgment indicating that the data portion of msg__5 was not successfully accommodated. To properly prepare this message, the destination retains at least some control information (e.g., a sequence number) from the initial transmission 102 adequate to identify the message to the source. In one embodiment, the source may return an acknowledgment 106 to the destination relating to the negative acknowledgment 104.

In accordance with a second condition discussed above, i.e., the probable inability of the destination node to accommodate messages for longer periods of time, subsequent messages are also runted until this condition subsides. Therefore, the initial transmission 103 of msg__6 is similarly runted and a runt__6 message 105 is sent from the destination to the source, and is likewise followed by an acknowledgment from the source to the destination 107. Since msg__5 has not yet been successfully accommodated, the expected message number at the destination node has not been incremented. However, the expected runt number has been incremented twice, in view of the runts of both msg__5 and msg__6. Similarly, at the source node, since the messages have not yet been successfully accommodated and therefore acknowledged, the expected acknowledgment number has not been incremented, but the sequence number of messages initially sent has been incremented twice.

Eventually, the destination node becomes able to accommodate the messages by, for example, posting a buffer for msg__5, and a pull request 108 is transmitted from the destination to the source requesting a retransmission of the data portion of msg__5. Similarly, a buffer has been posted for msg__6, at the destination, and a pull request 109 can similarly be transmitted for msg__6. The retained control information (e.g., sequence number) is used to support the later transmission of these pull requests from the destination. (Note that the source node has at this time been awaiting receipt of the pull requests, and has not performed any time-out/retransmits. The source node is awaiting the ability of the destination node to accommodate the data portions, and is therefore not making any needless retransmissions.)

In response to the pull requests, retransmissions msg__5r 110 and msg__6r 111 occur from the source to the destination, at which time the expected message number is incremented at the destination, noting the successful accommodation of these data portions. In response, acknowledgments 112 and 113 are transmitted from the destination to the source, at which time the expected acknowledgment numbers are also incremented at the source.

With respect to the next sequential message, msg__7 114, since a buffer has already been posted, no discard/retransmission cycle is necessary, the message is successfully accommodated at the destination, and an acknowledgment 115 is sent from the destination to the source acknowledging receipt of same. The expected acknowledgment number, sequence number, as well as the expected message number are incremented upon successful transmission and receipt, as depicted, but the expected runt number at the destination node has been pre-incremented upon the buffer posting, indicating that no runting of the next sequential message will be required due to buffer availability.

As discussed above, the source and destination nodes may each include a communication adapter to handle their interface to the communication medium. Further, Communication Subsystem Software ("CSS") may be implemented at the nodes, which is a layer of software running over the communication adapter.

The destination nodes keep track of the expected runt numbers and expected message numbers on a per-path basis (i.e., per source node). The expected runt number is equal to the sequence number following the last runted message, or successfully received message. If a message arrives at the destination with a different sequence number than expected, the expected runt number is examined. Messages with sequence numbers less than the expected runt number are dropped. Messages with sequence numbers greater than or equal to the expected runt number are runted, and the expected runt number is updated to the following sequence number. This ensures that messages are not runted multiple times.

The techniques of the present invention therefore generally assume sequential sending and in-order receipt of messages between the source and destination.

The following, exemplary packet formats show a message packet, having control information in the first few fields thereof, followed by a data portion. Pull request, and pull reply message packets can be used to request a retransmission by the destination, and provide the retransmitted data from the source to the destination at the appropriate time, as discussed above. Further, an acknowledgment packet can be used as either a positive or negative acknowledgment, as discussed above. The formats depicted are followed by Exemplary Fields for the control information. The Exemplary Fields include, for example, a FLAGS field which can effect a positive or negative acknowledgment, as well as a SEQ. # field which specifies the sequence number assigned to the message.

Those skilled in the art will further recognize that the packets shown herein may include other facilitating control information, e.g., intramessage packet ordering information, and low-level flow control acknowledgments, and no limitation should be inferred from the absence of any such control information from these exemplary formats.

| 0 | 1 | 2 | 3 | 4 | 5 | 6 | 7 |
|---|---|---|---|---|---|---|---|
| R0 | R1 | R2 | R3 | R4 | R5 | R6 | ///// |
| SEQ# | FLAGS | PKTFID | | SOURCE | | PA | CONTEXT |
| CONTROL | | LENGTH | | TYPE | | DESTINATION | |
| reserved | | reserved | | SEND_DESC | | PARTITION | |
| HDR_CRC | | | | ///////////////////////////////// | | | |
| DATA (0) | | | | | | | |
| DATA (1) | | | | | | | |
| DATA (2) | | | | | | | |
| — | | | | | | | |
| — | | | | | | | |
| — | | | | | | | |
| DATA (n-1) | | | | | | | |
| DATA_CRC | | | | ///////////////////////////////// | | | |

Message Packet

| 0 | 1 | 2 | 3 | 4 | 5 | 6 | 7 |
|---|---|---|---|---|---|---|---|
| R0 | R1 | R2 | R3 | R4 | R5 | R6 | ///// |
| SEQ# | FLAGS | PKTFID | | SOURCE | | PA | CONTEXT |
| CONTROL | | reserved | | TYPE | | DESTINATION | |
| PRP_SDI | | PRP_RDI | | SEND_DESC | | PARTITION | |
| HDR_CRC | | | | ///////////////////////////////// | | | |

Pull Request Message Packet

| 0 | 1 | 2 | 3 | 4 | 5 | 6 | 7 |
|---|---|---|---|---|---|---|---|
| R0 | R1 | R2 | R3 | R4 | R5 | R6 | ///// |
| SEQ# | FLAGS | PKTFID | | SOURCE | | PA | CONTEXT |
| CONTROL | | LENGTH | | TYPE | | DESTINATION | |
| reserved | | PRP_RDI | | SEND_DESC | | PARTITION | |
| HDR_CRC | | | | ///////////////////////////////// | | | |
| DATA (0) | | | | | | | |
| DATA (1) | | | | | | | |
| DATA (2) | | | | | | | |
| — | | | | | | | |
| — | | | | | | | |
| — | | | | | | | |
| DATA (n-1) | | | | | | | |
| DATA_CRC | | | | ///////////////////////////////// | | | |

Pull Reply Message Packet

| 0 | 1 | 2 | 3 | 4 | 5 | 6 | 7 |
|---|---|---|---|---|---|---|---|
| R0 | R1 | R2 | R3 | R4 | R5 | R6 | ///// |
| SEQ# | FLAGS | PKTFID | | DEST (of msg) | | PA | CONTEXT |
| reserved | | PARTITION | | TYPE | | SOURCE (of msg) | |
| HDR_CRC | | | | ///////////////////////////////// | | | |

Acknowledgment Packet

Exemplary Fields

CONTROL

This field is taken from the send message descriptor and describes various characteristics of the message.

Kernel/-User Message

Destination Interrupt Requested

Pull Reply

Pull Request

Resend

Rendezvous Request

For more details refer to the definition of a send message descriptor.

| | |
|---|---|
| LENGTH: | Specifies number of data bytes in the message. This is the amount of data that will be transmitted as the message payload. |
| TYPE: | Specifies message type. |
| DESTINATION: | Specifies physical (real) destination node id. |
| SOURCE: | Specifies the physical (real) origin node id. |
| PARTITION: | Specifies the logical partition within which the node resides. |
| SEND_DESC: | Specifies the indexed location of the Send Message Descriptor in adapter control storage. |
| PRP_SDI: | Is a pull request pointer to the Send Descriptor Index of message being pulled. |
| PRP_RDI: | Is a pull request pointer to the Receive Descriptor Index into which the pulled message is being received. |
| CONTEXT: | Specifies the message context. |
| PATH (PA): | Specifies the message path. This field is 2 bits long, determines which of the four logical paths the message will be sent along. These may or may not correspond to different physical routes through the network. |
| SEQ #: | Specifies the sequence number assigned to the message when it was transmitted. |
| PKTFID: | Specifies the pack format id. The adapter will not receive messages with a different pack format id. |
| FLAGS: | Specifies packet attributes. |

| BIT # | DESCRIPTION |
|---|---|
| 0 | Kernel Message |
| 1 | Message/-Acknowledgment |
| 2 | First Packet |
| 3 | Last Packet |

-continued

| | |
|---|---|
| 4 | reserved |
| 5 | reserved |
| 6 | reserved for TB3 |
| 7 | reserved for TB3 |

| | |
|---|---|
| HDR_CRC: | Cyclic redundancy code on the header portion of the packet to provide protection during transmission over the fabric. |
| DATA_CRC: | Cyclic redundancy code on the data portion of the packet to provide protection during transmission over the fabric. |
| R #: | Route byte used by switch to direct the packet through the fabric. Each route byte consists of two route nibbles. The TB4 switch chip uses the nibbles, most significant nibble first. An odd number of switch levels require the use of half a route byte. In this case, the last route byte will only have the least significant route nibble valid. |

| 0 | 1 | 2 | 3 | 4 | 5 | 6 | 7 |
|---|---|---|---|---|---|---|---|
| N | Route Nibble #8 | | | P | Route Nibble #1 | | |

| | |
|---|---|
| N: | Route nibble selection |

| BIN | DESCRIPTION |
|---|---|
| 0 | Route nibbles #0 and #1 are valid |
| 1 | Route nibble #1 is valid (#0 will not be used) |

| | |
|---|---|
| P: | Route parity bit. This bit is used to protect the route byte during transmission on the fabric. The route byte must have odd parity, and this bit is to be set so the route bits (0:7) have an odd number of ones. |

The present invention can be included in an article of manufacture (for example, one or more computer program products) having, for example, computer usable media such as the media 22 of FIG. 1 or the memory/data structures presented above. The media has embodied therein, for example, computer readable program code means for providing and facilitating the mechanisms of the present invention. The article of manufacture can be included as part of a system or sold separately. Whether in the above-described article of manufacture, or within other memory components, the present invention also includes the formatted message, buffer, command and any other data structures discussed above which also facilitate the mechanisms of the present invention.

While the invention has been particularly shown and described with reference to preferred embodiments) thereof, it will be understood by those skilled in the art that various changes in form and details may be made therein without departing from the spirit and scope of the invention.

What is claimed is:

1. An article of manufacture comprising a computer useable medium having computer readable program code means embodied therein for flow-controlling a plurality of messages from a source node into a destination node in a message processing system, the plurality of messages including a first message comprising a data portion, the computer readable program code means in said article of manufacture comprising:

code means for the source node transmitting (102) the data portion of the first message, and related control information, to the destination node;

code means for, in response to the destination node receiving but being unable to retain, due to conditions therein, the data portion of the first message, the destination node discarding the data portion of the first message; and code means for, in response to the destination node thereafter being able to retain, due to changed conditions therein, the data portion of the first message, the destination node initiating a retransmission (110) of the data portion of the first message from the source node using said related control information.

2. The article of manufacture of claim 1, further comprising:

code means for, in response to the destination node being unable to retain the data portion of the first message, the destination node retaining at least some of the related control information.

3. The article of manufacture of claim 2, wherein said code means for the destination node initiating a retransmission (110) of the data portion of the first message includes:

code means for the destination node using the retained at least some of the related control information to transmit (108) a first pull request to the source node to retransmit the data portion of the first message.

4. The article of manufacture of claim 3, further comprising:

code means for, in response to the first pull request, the source node retransmitting (110) the data portion of the first message to the destination node.

5. The article of manufacture of claim 4, further comprising:

code means for, in response to the destination node being unable to retain the data portion of the first message, the destination node sending (104) a first negative acknowledgment to the source node; and code means for, in response to the source node receiving the first negative acknowledgment, the source node waiting for receipt of the first pull request before retransmitting (110) the data portion of the first message.

6. The article of manufacture of claim 5, further comprising:
   code means for the source node transmitting (106) to the destination node a first acknowledgment of the first negative acknowledgment; and
   code means for the destination node retransmitting (112) to the source node a first acknowledgment of the retransmitted (110) first data portion of the first message.

7. The article of manufacture of claim 1, wherein the plurality of messages includes a second message, sequential to the first message, and comprising a data portion, the article of manufacture further comprising:
   code means for, subsequent to said transmitting (102) the data portion of the first message, the source node transmitting (103) the data portion of the second message, and related control information, to the destination node;
   code means for, in response to the destination node being unable to retain the data portion of the first message, the destination node also discarding the data portion of the second message; and
   code means for, in response to the destination node thereafter being able to retain the data portion of the second message, the destination node initiating a retransmission (111) of the data portion of the second message from the source node.

8. The article of manufacture of claim 7, wherein the first and second messages are sequentially identified, and are generally expected to arrive at the destination node in the same order in which they were transmitted from the source node, and wherein the control information of the first and second messages comprises respective sequence indicia thereof.

9. The article of manufacture of claim 7, wherein the plurality of messages includes at least one message subsequent to the second message, each of which is transmitted to the destination node, and wherein respective data portions of the at least one message are retained in response to the destination node's ability to retain them, or are discarded by the destination node in response to the destination node's inability to retain them and not retransmitted thereto until the destination node initiates respective retransmissions thereof due to its subsequent ability to retain them.

10. The article of manufacture of claim 1, wherein the destination node is unable to retain the data portion of the first message due to buffer unavailability, and wherein the destination node is thereafter able to retain the data portion of the first message due to buffer availability.

11. An article of manufacture comprising a computer useable medium having computer readable program code means embodied therein for flow-controlling a plurality of sequential messages from a source node into a destination node in a message processing system, each of the plurality of messages including a first data portion and related control information including respective identifying indicia thereof, the computer readable program code means in said article of manufacture comprising:
   code means for initially transmitting the respective data portions and the respective control information of a first message and at least one subsequent message of the plurality of messages from the source node to destination node; and
   code means for, in response to the destination node receiving but being unable to retain, due to conditions therein, the data portion of the first message:
      the destination node discarding the data portion of the first message but retaining the identifying indicia of the control information thereof, and sending a negative acknowledgment relating to the first message to the source node using said control information, and until it is able to retain, due to changed conditions therein, any data portions of messages, the destination node discarding respective data portions of the at least one subsequent message as they are received thereby but retaining the respective identifying indicia of the respective control information thereof, and sending respective negative acknowledgments relating thereto to the source node using said respective control information.

12. The article of manufacture of claim 11, further comprising:
   code means for, as the destination node becomes able to retain the respective data portions of the first message and any of the at least one subsequent message, the destination node initiating, via respective pull requests to the source node, respective retransmissions of the respective data portions of the first message and said any of the at least one subsequent message.

13. The article of manufacture of claim 12, further comprising:
   code means for, in response to said respective pull requests from the destination node, the source node retransmitting the respective data portions of the first message and said any of the at least one subsequent message to the destination node.

14. The article of manufacture of claim 13, further comprising:
   code means for the destination node incrementing an expected runt number as respective data portions of messages are discarded and negative acknowledgments transmitted to the source node therefor.

15. The article of manufacture of claim 14, further comprising:
   code means for the destination node incrementing an expected message number as respective initial transmissions or retransmissions of data portions of messages are successfully retained; and
   code means for the destination node respectively acknowledging the successful retention of the respective initial transmissions or retransmissions of the data portions of messages to the source node.

16. The article of manufacture of claim 15, further comprising:
   code means for the source node incrementing a message sent number as respective initial transmissions of data portions of messages are made.

17. The article of manufacture of claim 16, further comprising:
   code means for the source node incrementing an expected acknowledgment number as respective acknowledgments of successfully retained initially transmitted or retransmitted data portions of messages are received from the destination node.

18. The article of manufacture of claim 11, further comprising:
   code means for, in response to the destination node being able to retain the data portion of the first message:
      the destination node retaining, and acknowledging to the source node the successful retention of, the data portion of the first message.

19. The article of manufacture of claim 18, wherein the destination node is unable to retain the data portions of messages due to buffer unavailability, and wherein the destination node is able to retain data portions of messages due to buffer availability.

* * * * *